US011137585B2

(12) United States Patent
Ma

(10) Patent No.: US 11,137,585 B2
(45) Date of Patent: Oct. 5, 2021

(54) LENS MODULE

(71) Applicant: AAC Technologies Pte. Ltd., Singapore (SG)

(72) Inventor: Jie Ma, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 181 days.

(21) Appl. No.: 16/530,985

(22) Filed: Aug. 2, 2019

(65) Prior Publication Data
US 2020/0057285 A1 Feb. 20, 2020

(30) Foreign Application Priority Data

Aug. 15, 2018 (CN) .......................... 201821318441.6

(51) Int. Cl.
| | |
|---|---|
| G02B 13/00 | (2006.01) |
| G02B 15/17 | (2006.01) |
| G03B 11/04 | (2021.01) |
| G02B 7/02 | (2021.01) |
| G03B 19/02 | (2021.01) |
| G03B 30/00 | (2021.01) |
| G03B 17/02 | (2021.01) |
| G02B 13/16 | (2006.01) |
| G03B 19/14 | (2021.01) |
| G03B 17/12 | (2021.01) |
| G02B 7/00 | (2021.01) |

(52) U.S. Cl.
CPC ......... G02B 15/17 (2013.01); G02B 13/0015 (2013.01); G03B 11/045 (2013.01); *G02B 7/003* (2013.01); *G02B 7/02* (2013.01); *G02B 13/001* (2013.01); *G02B 13/16* (2013.01); *G03B 17/02* (2013.01); *G03B 17/12* (2013.01); *G03B 19/02* (2013.01); *G03B 19/14* (2013.01); *G03B 30/00* (2021.01); *G03B 2217/002* (2013.01)

(58) Field of Classification Search
CPC ........ G02B 7/02; G02B 7/003; G02B 13/001; G02B 13/0015; G03B 11/045; G03B 17/02; G03B 17/12; G03B 19/02; G03B 19/14; G03B 2217/002; G03B 30/00
USPC .................................. 359/819, 821, 829, 830
See application file for complete search history.

(56) References Cited

U.S. PATENT DOCUMENTS

| | | | | |
|---|---|---|---|---|
| 7,417,810 B2 * | 8/2008 | Feng | ....................... | G02B 7/023 |
| | | | | 359/811 |
| 8,014,655 B2 * | 9/2011 | Chang | .................... | G02B 7/021 |
| | | | | 359/819 |

(Continued)

*Primary Examiner* — Evelyn A Lester
(74) *Attorney, Agent, or Firm* — W&G Law Group

(57) ABSTRACT

A lens module is provided, including: a lens barrel including first and second barrel walls; and a set of lenses received in the lens barrel and including at least a first lens and a second lens arranged from an object side to an image side. The first lens includes a first optical portion and a first peripheral portion surrounding the first optical portion. A surface of the first barrel wall close to the image side includes a first planar surface extending horizontally towards an optical axis from a position where the first barrel wall is connected to the second barrel wall; a first oblique surface extending obliquely from the first planar surface towards the optical axis and towards the image side; and a second planar surface extending horizontally from the first oblique surface towards the optical axis.

7 Claims, 2 Drawing Sheets

(56) References Cited

U.S. PATENT DOCUMENTS

| | | | | |
|---|---|---|---|---|
| 8,270,103 B2* | 9/2012 | Miyawaki | ............. | G02B 7/022 |
| | | | | 359/819 |
| 8,292,524 B1* | 10/2012 | Yu | ........................ | G02B 13/004 |
| | | | | 396/529 |
| 9,304,233 B2* | 4/2016 | Kim | .................... | G02B 13/0015 |
| 2008/0239519 A1* | 10/2008 | Lin | ...................... | G02B 13/003 |
| | | | | 359/819 |
| 2011/0085070 A1* | 4/2011 | Kang | ..................... | G02B 7/022 |
| | | | | 359/819 |
| 2013/0271858 A1* | 10/2013 | Koh | ....................... | G02B 7/021 |
| | | | | 359/819 |
| 2014/0078606 A1* | 3/2014 | Wu | ......................... | G02B 7/02 |
| | | | | 359/827 |
| 2016/0085046 A1* | 3/2016 | Kim | ....................... | G02B 7/026 |
| | | | | 359/830 |

* cited by examiner

LENS MODULE

TECHNICAL FIELD

The present disclosure relates to the technical field of camera lenses, and in particular, to a lens module.

BACKGROUND

With development of technologies, electronic devices are becoming more and more intelligent. In addition to digital cameras, portable electronic devices such as tablets and cellphones are also equipped with a lens module. In order to meet the user's requirement, there is a higher demand on a quality of an object image photographed by the lens module.

However, in the existing mixed lenses, since a first lens is a glass lens and a precision of an outer diameter cannot be guaranteed, the first lens needs to be matched with a lens barrel. The first lens and the lens barrel are matched in a normal manner. In order to guarantee a thickness of an edge of the lens, a lower surface of the first lens also needs to be formed as a matching structure. Since the glass can only be processed as a matching angle larger than 45°, a light-blocking sheet is easily deflected and an assembly yield thereof is low. Moreover, there is significant force transmission occurring during assembly, the assembly may be unstable.

Therefore, it is necessary to provide a new lens module.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

In the following embodiments, a left-right direction of the paper is referred to as a horizontal direction, and a direction of the paper perpendicular to the horizontal direction, i.e., an upper-low direction of the paper, is referred to as a vertical direction.

Embodiment 1

Figure 1:
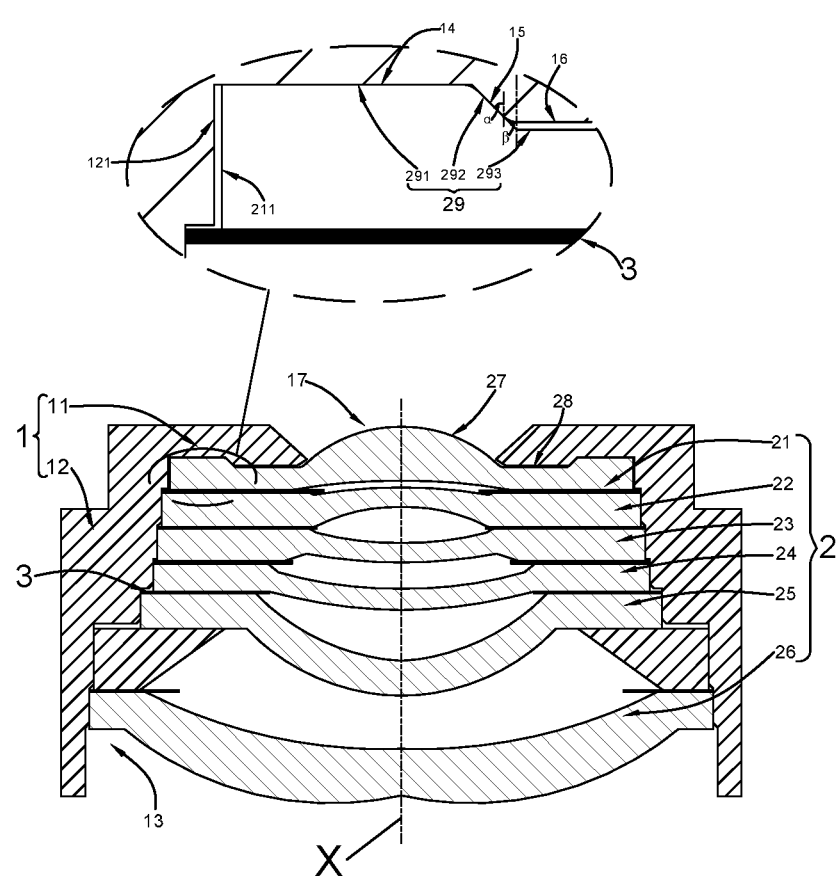
FIG. 1 is a cross-sectional view of a structure of a lens module according to the present disclosure.

As shown in FIG. 1, an embodiment of the present disclosure provides a lens module. The lens module includes a lens barrel 1, and a set of lenses 2 and a light-blocking member 3 received in the lens barrel 1. The set of lenses 2 includes at least a first lens 21 and a second lens 22 that are arranged from an object side to an image side.

Figure 2:
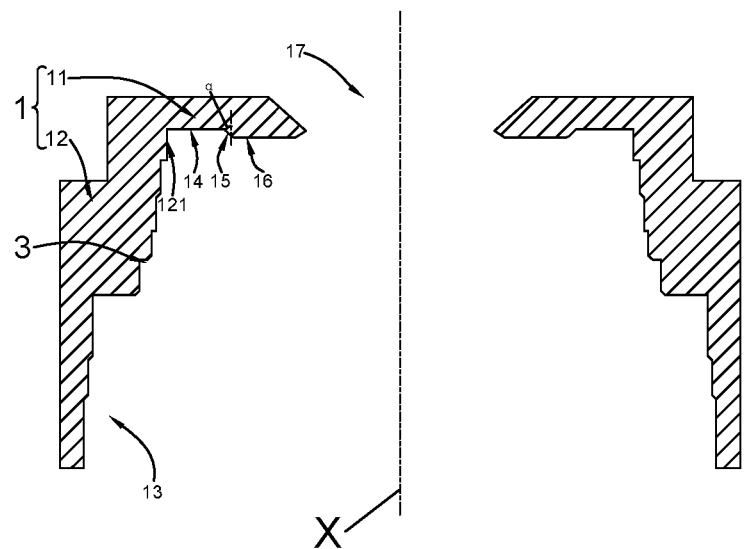
FIG. 2 is a cross-sectional view of a structure of a lens barrel according to the present disclosure.

As shown in FIG. 1 and FIG. 2, the lens barrel 1 includes a first barrel wall 11 defining a light through hole 17 and extending horizontally, a second barrel wall 12 bent and extending from the first barrel wall 11, and a receiving space 13 enclosed by the first barrel wall 11 and the second barrel wall 12. The first barrel wall 11 includes a first surface close to the object side and a second surface close to the image side. The second surface of the first barrel wall 11 includes a first planar surface 14 extending horizontally towards an optical axis X from a position where the first barrel wall 11 is connected to the second barrel wall 12, a first oblique surface 15 extending obliquely from the first planar surface 14 towards the optical axis X and the image side, and a second planar surface 16 extending horizontally from the first oblique surface 15 towards the optical axis. The second barrel wall 12 includes an inner wall surface close to the optical axis X, and an outer wall surface disposed opposite to the inner wall surface. The inner wall surface of the second barrel wall 12 includes a first vertical surface 121 extending vertically from the first planar surface 14 along a direction of the optical axis X.

In this embodiment, the set of lenses 2 include a first lens 21, a second lens 22, a third lens 23, a fourth lens 24, a fifth lens 25, and a sixth lens 26 that are received in the lens barrel 1 sequentially along a direction from an object side of the lens barrel 1 to an image side of the lens barrel 1. The first lens 21 includes a first optical portion 27 and a first peripheral portion 28 surrounding the first optical portion 27. Each of the other lenses includes an optical portion and a peripheral portion surrounding the optical portion. In other embodiments, a different number of lenses may be provided. However, the set of lens 2 includes at least two lenses, i.e., a first lens 21 and a second lens 22. The first lens 21 is a glass lens. Other lenses such as the second lens 22, the third lens 23, and the fourth lens 24 may be glass lenses, or plastic lenses or lenses made of other materials.

In order to guarantee a thickness of an edge of the first lens 21 and prevent the light-blocking member 3 from being deflected, a matching portion of the peripheral portion 28 of the first lens 21 matched with the lens barrel 1 is improved in this embodiment, and a specific improvement manner thereof will be described as follows.

Figure 3:
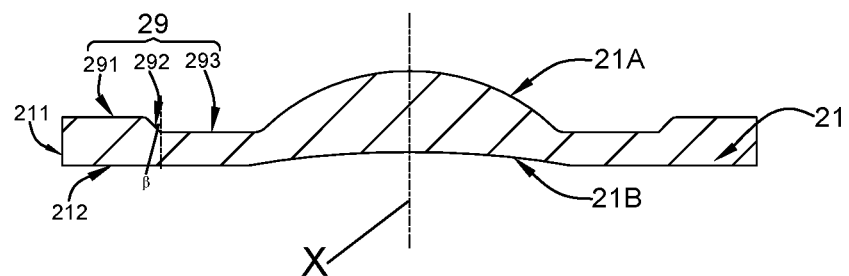
FIG. 3 is a structural schematic view of a first lens of a lens module according to the present disclosure.

As shown in FIG. 3, the first lens 21 includes a first surface and a second surface disposed opposite to the first surface. The first surface is an upper surface of the first lens 21, i.e., an object side surface 21A. The second surface is a lower surface of the first lens 21, i.e., an image side surface 21B. The object side surface 21A of the first peripheral portion 28 of the first lens 21 includes a first matching portion 29 that is matched with the second surface of the first barrel wall 11. The first matching portion 29 includes a third planar surface 291 extending horizontally from an edge of the first peripheral portion 28 towards the optical axis X, a second oblique surface 292 extending obliquely from the third planar surface 291 towards the optical axis X and the image side, and a fourth planar surface 293 extending horizontally from the second oblique surface 292 towards the optical axis X. The first planar surface 14 partially fits the third planar surface 291. An outer edge of the first lens 21 is spaced apart from the inner wall surface of the second barrel wall 12. Specifically, the first lens 21 further includes a connecting surface 211 connecting the object side surface 21A with the image side surface 21B (i.e., connecting the upper surface with the lower surface), and the connecting surface 211 is spaced apart from the first vertical surface 121. The first oblique surface 15 partially fits the second oblique surface 292, and the second planar surface 16 is spaced apart from the fourth planar surface 293.

Further, the first planar surface 14 and the first oblique surface 15 form a concave that recesses from the second surface of the first barrel wall 11 towards the first surface, and the third planar surface 391 and the second oblique surface 292 form a convex that protrudes towards the first barrel wall 11. The convex and the concave form concave-convex matching to achieve assembly of the first lens 21 and the lens barrel 1. The first oblique surface 15 forms a first angle α with respect to a vertical direction (i.e., the direction of the optical axis X) (see FIG. 2 for details), and the second oblique surface 292 forms a second angle β with respect to the vertical direction (i.e., the direction of the optical axis X) (see FIG. 3 for details). Here, the first angle α is equal to the second angle β, and the first angle α is larger than or equal to 0° and smaller than 90°.

In addition, the image side surface 21B of the first lens 21 includes a fifth planar surface 212 extending horizontally from the connecting surface 211 towards the optical axis X, and the fifth planar surface 212 is connected to the first optical portion. In this embodiment, the light-blocking member 3 is arranged in a gap between the first lens 21 and the second lens 22. Specifically, the image side surface 21B of the first lens 21 is not provided with a matching portion that is matched with the second lens 22, and the light-blocking member 3 directly abuts against the fifth planar surface 212 of the first lens 21 and the object side surface of the second lens 22, details for which are shown in FIG. 1.

In this embodiment, a light-blocking sheet is provided between the second lens 22 and the third lens 23, between the third lens 23 and the fourth lens 24, and between the fourth lens 24 and the fifth lens 25. A light-blocking sheet and a light-blocking plate are arranged between the fifth lens 25 and the sixth lens 26. The light-blocking member 3 is positioned according to an inner diameter of the second barrel wall 12, but is not limited thereto, and the light-blocking member 3 may also be positioned in some other way, for example, by a matching structure between adjacent lenses. It should be noted that the light-blocking member 3 may be a light-blocking sheet or a light-blocking plate, and a light-blocking sheet and/or a light-blocking plate can be arranged between the lenses according to actual needs.

Further, when the sixth lens 26 is assembled with the lens barrel 1, the peripheral portion of the sixth lens 26 is fixed by a press-ring or adhesive dispense, so as to complete the assembly of the overall lens module.

Compared with the prior art, the matching structure of the first lens and the inner wall surface of the lens barrel in the lens module according to the present disclosure can guarantee the thickness of the edge of the first lens while preventing the light-blocking member from being deflected. In this way, a transmission force during assembly can be stabilized, thereby significantly improving the assembly yield of the light-blocking member. Thus, the overall assembly yield thereof and the mold processing precision can be improved.

The above are only preferred embodiments of the present disclosure. Here, it should be noted that those skilled in the art can make modifications without departing from the inventive concept of the present disclosure, but these shall fall into the protection scope of the present disclosure.

What is claimed is:
1. A lens module, comprising:
a lens barrel; and
a set of lenses received in the lens barrel, the set of lenses comprising at least a first lens and a second lens arranged from an object side to an image side, the lens barrel comprising an first barrel wall defining a light through hole and a second barrel wall bent and extending from the first barrel wall, the first barrel wall comprising a first surface close to the object side and a second surface close to the image side, and the first lens comprising a first optical portion and a first peripheral portion surrounding the first optical portion,
wherein the second surface comprises:
a first planar surface extending horizontally towards an optical axis from a position where the first barrel wall is connected to the second barrel wall;
a first oblique surface extending obliquely from the first planar surface towards the optical axis and towards the image side; and
a second planar surface extending horizontally from the first oblique surface towards the optical axis,
an object side surface of the first peripheral portion comprises:
a third planar surface extending horizontally from an edge of the first peripheral portion towards the optical axis;
a second oblique surface extending obliquely from the third planar surface towards the optical axis and towards the image side; and
a fourth planar surface extending horizontally from second oblique surface towards the optical axis,
the first planar surface fits the third planar surface, the first oblique surface fits the second oblique surface, the second planar surface is spaced apart from the fourth planar surface, and the first lens is a glass lens;
an outer edge of the first lens is spaced apart from an inner wall surface of the second barrel wall.

2. The lens module according to claim 1, wherein the first planar surface partially fits the third planar surface, and the first oblique surface partially fits the second oblique surface.

3. The lens module according to claim 1, wherein the first lens further comprises a connecting surface extending vertically from the third planar surface along a direction of the optical axis, the inner wall surface of the second barrel wall comprises a first vertical surface parallel to the connecting surface, and the first vertical surface is spaced apart from the connecting surface.

4. The lens module according to claim 2, wherein the first oblique surface forms a first angle with respect to a direction of the optical axis, the second oblique surface forms a second angle with respect to the direction of the optical axis, and the first angle is equal to the second angle.

5. The lens module according to claim 4, wherein the first angle is larger than or equal to 0° and smaller than 90°.

6. The lens module according to claim 1, wherein the second lens is a glass lens or a plastic lens.

7. The lens module according to claim 1, further comprising a light-blocking member arranged between the first lens and the second lens.

* * * * *